(12) United States Patent
Fahrenbach

(10) Patent No.: US 9,186,859 B2
(45) Date of Patent: Nov. 17, 2015

(54) METHOD FOR OPERATING A PRESS WITH SLIDING BEARING LUBRICATION AS A FUNCTION OF THE PRESS OPERATING STATE

(75) Inventor: Jurgen Fahrenbach, Aichelberg (DE)

(73) Assignee: SCHULER PRESSEN GMBH, Göppingen (DE)

(*) Notice: Subject to any disclaimer, the term of this patent is extended or adjusted under 35 U.S.C. 154(b) by 455 days.

(21) Appl. No.: 13/558,449

(22) Filed: Jul. 26, 2012

(65) Prior Publication Data
US 2013/0025475 A1    Jan. 31, 2013

(30) Foreign Application Priority Data

Jul. 27, 2011   (DE) .......................... 10 2011 108 600
Jan. 24, 2012   (DE) .......................... 10 2012 100 574

(51) Int. Cl.
| | |
|---|---|
| B30B 13/00 | (2006.01) |
| B30B 1/14 | (2006.01) |
| B30B 1/26 | (2006.01) |
| B30B 15/00 | (2006.01) |
| F16N 7/38 | (2006.01) |
| F16N 25/00 | (2006.01) |
| F16N 25/02 | (2006.01) |

(52) U.S. Cl.
CPC ... *B30B 1/14* (2013.01); *B30B 1/26* (2013.01); *B30B 15/0088* (2013.01); *F16N 7/385* (2013.01); *F16N 25/00* (2013.01); *F16N 25/02* (2013.01)

(58) Field of Classification Search
CPC ........ B30B 15/0088; B30B 1/14; B30B 1/26; F16N 25/02; F16N 7/385
USPC ........ 100/280, 281, 282, 283, 286, 35; 72/43; 184/6.14, 7.1, 7.3, 27.2; 60/456, 560, 60/563, 565; 384/369, 398
See application file for complete search history.

(56) References Cited

U.S. PATENT DOCUMENTS

| | | | | |
|---|---|---|---|---|
| 1,780,629 | A | * | 11/1930 | Otto .............................. 425/107 |
| 1,781,149 | A | * | 11/1930 | Zimmermann .............. 184/6.14 |
| 2,375,269 | A | * | 5/1945 | Yeomans ...................... 384/398 |
| 2,593,115 | A | * | 4/1952 | Danly .......................... 184/6.14 |
| 3,298,460 | A | * | 1/1967 | Porter et al. ................... 184/7.4 |
| 3,578,112 | A | * | 5/1971 | Freeland .......................... 184/6 |
| 3,856,114 | A | * | 12/1974 | Zankl ............................. 184/6.1 |
| 4,186,821 | A | * | 2/1980 | Wegmann ..................... 184/7.4 |

(Continued)

FOREIGN PATENT DOCUMENTS

DE    10 2008 028 652 B3    1/2010

*Primary Examiner* — Shelley Self
*Assistant Examiner* — Leonel Vasquez
(74) *Attorney, Agent, or Firm* — R. S. Lombard; K. Bach

(57) ABSTRACT

A press, a method for operating the press, and a lubricating arrangement for the press or for another working machine. The press has a press drive that is connected with a ram of the press, which ram can be moved via a transmission in a working direction (Z). The transmission has at least one sliding bearing with one and, preferably, several lubricating points. In a first press operating state, all the lubricating points of the sliding bearing are supplied with lubricant at a first lubricant pressure (p1). In a second press operating state, the thickness of the lubricant film formed in the sliding bearing drops below a minimum value in the region of at least one first lubricating point and lubricant is supplied thereto at a second greater lubricating pressure (p2) in order to prevent increased wear of the sliding bearing.

13 Claims, 6 Drawing Sheets

(56) References Cited

U.S. PATENT DOCUMENTS

| | | | |
|---|---|---|---|
| 4,376,410 A * | 3/1983 | Wissman et al. | 100/214 |
| 4,738,336 A * | 4/1988 | Smith et al. | 184/6.4 |
| 4,836,693 A * | 6/1989 | Stroze | 384/121 |
| 5,287,833 A * | 2/1994 | Yashiro | 123/196 CP |
| 5,626,470 A * | 5/1997 | Gerhardt | 418/84 |
| 6,007,249 A * | 12/1999 | Bornhorst | 384/118 |
| 6,186,061 B1 * | 2/2001 | Burns et al. | 100/282 |
| 7,024,913 B2 * | 4/2006 | Tang et al. | 72/446 |
| 7,374,019 B2 * | 5/2008 | Kosugi et al. | 184/6.14 |
| 7,909,594 B2 * | 3/2011 | Kock | 425/107 |
| 8,695,763 B2 * | 4/2014 | Haas et al. | 184/7.4 |
| 2006/0073037 A1 * | 4/2006 | Pedersen et al. | 417/415 |
| 2008/0078620 A1 * | 4/2008 | Yanohara | 184/6.14 |
| 2013/0247781 A1 * | 9/2013 | Fahrenbach | 100/35 |

* cited by examiner

METHOD FOR OPERATING A PRESS WITH SLIDING BEARING LUBRICATION AS A FUNCTION OF THE PRESS OPERATING STATE

CROSS-REFERENCE TO RELATED APPLICATION

This application claims the priority of German Application No. 10 2011 108 600.9 filed Jul. 27, 2011 and the priority of German Application No. 10 2012 100 547.5 filed Jan. 24, 2012.

BACKGROUND OF THE INVENTION

The present invention relates to a press as well as to a method for operating a press. The press comprises a ram that can be moved via a press drive. The press drive comprises a motor as well as a press transmission connecting the motor with the ram.

Depending on its design, the press transmission comprises one, or also more, sliding bearings. On each sliding bearing, a first transmission element is supported so as to slide on a second transmission element. A servo press comprising sliding bearings has been known, for example, from publication DE 10 2008 028 652 B3. It describes an eccentric mechanism, wherein the eccentric rod is rotatably supported on the eccentric via a sliding bearing. The other axial end of the eccentric rod is connected with the ram via another sliding bearing.

Such sliding bearings require lubrication. In order to avoid any undesirably high wear, a lubricant film having a minimum thickness must be interposed between the two transmission elements that are supported against each other via the sliding bearing. A hydrodynamic lubrication is achieved as long as the two transmission element move or rotate at a sufficiently high relative speed relative to each other. In such a press operating state, a lubricant film is achieved, said lubricant film having sufficient thickness to keep the wear on the sliding bearing minimal and to avoid damage on the sliding bearing. This requires a lubricant film thickness that is greater than the largest particles of debris that are present in the lubricant.

Presses and, in particular servo presses, can be operated with variable position and/or force controls of the ram. Until now, sections in the motion profile of the ram, in which said ram moves either very slowly and/or the application of a ram force is temporarily stopped altogether, have been avoided. For example, the ram may stop in the region of its lower reversal point in order for processing the reshaped workpiece, for example by welding. In the case of molding presses, it may also be necessary to maintain the ram force for a certain period of time in the lower reversal point of the ram. Furthermore, the press drive may also initiate a pendulum movement of a drive shaft so that the two transmission elements of the sliding bearing only move in pendulum fashion or oscillate relative to each other within a certain angular range and no longer rotate relative to each other.

Considering these aforementioned examples of motion and/or force control of the ram, it can be difficult to generate a sufficiently thick lubricant film on the sliding bearing. Therefore, there is the risk that particles of debris contained in the lubricant cause increased wear and ultimately lead to a prematurely defective sliding bearing.

Consequently, the object of the invention may be viewed to be the provision of a press and a method, respectively, for operating a press wherein the lubrication of the sliding bearing of the transmission is improved.

SUMMARY OF THE INVENTION

The invention relates to a press (20), to a method for operating the press (20), as well as to a lubricating arrangement (50) for the press (20) or for another working machine. The press (20) comprises a press drive (24) that is connected with a ram (22) of the press (20), which ram can be moved via a transmission (31) in a working direction (Z). The transmission (31) comprises at least one sliding bearing (28) with one and, preferably, several lubricating points (51). In a first press operating state, all the lubricating points (51) of the sliding bearing (28) are supplied with lubricant at a first lubricant pressure (p1). In a second press operating state, the thickness of the lubricant film (54) formed in the sliding bearing (28) drops below a minimum value in the region of at least one first lubricating point (51a). In this second press operating state, the at least one lubricating point (51a) is supplied with lubricant at a second lubricating pressure (p2), said second pressure (p2) being greater than the first lubricant pressure (p1), in order to avoid any increased wear of the sliding bearing (28).

In accordance with the invention, a lubricant is transported to the sliding bearing or to at least one lubricating point of the sliding bearing with the use of a lubricating arrangement. Preferably, the sliding bearing has several lubricating points. The lubricant pressure and/or lubricant flow to at least one of the lubricating points is adjusted as a function of the press operating state. In doing so, the press operating state is determined, in particular, by the ram movement and/or the ram force applied by the ram while a workpiece is being reshaped. The state on the sliding bearing is also determined by way of this press operating state. In order to ensure sufficiently good lubrication in each of the press operating states, the lubricant pressure and/or the lubricant flow must be sufficient for lubrication. For example, at least one of the lubricating points of the sliding bearing is supplied with different lubricant pressures in adaptation to the respective press operating state. For example, the lubricant pressure can be varied in two or more stages. Due to this design, the user of the press is given greater variability when pre-specifying any time-dependent motion and power profiles for the ram. As a result of the inventive press and the inventive method, respectively, it is also possible to enable stationary or quasi-stationary ram positions under the load of the press ram, without damaging the at least one sliding bearing and without increasing the wear of said bearing.

Advantageously, the press operating state is determined by the path/time profile and/or the force/time profile of the press ram and/or by the relative speed between the first transmission element and the second transmission element. Considering a preferred embodiment of the invention, a first press operating state exists when the relative speed between the two transmission elements on the sliding bearing corresponds to at least one pre-specified threshold value. If the relative speed is lower than the threshold value, the press is in a second press operating state. Referring, in particular, to the second press operating state, a lubricant pressure is adjusted on the at least one lubricating point of the sliding bearing, said lubricant pressure being greater than the lubricant pressure on this sliding bearing point in the first press operating state. In this manner, a state-dependent lubrication of the sliding bearing is achieved and any wear of the sliding bearing is minimized.

The pre-specified threshold value for the relative speed may be pre-specified as a function of parameters and, for example, may be a function of the bearing force and/or the bearing play and/or the viscosity of the lubricant. The viscosity of the lubricant, in turn, may be prespecified as a function of temperature. The bearing force, in particular, is a function of the geometric configuration of the transmission as well as of the ram force applied by the ram. In a servo press, the ram force can be determined, for example, via the driving torque of the motor. In addition, the bearing force may be a function of the counter-force of a weight equalizing arrangement, provided the press comprises a weight equalizing arrangement offsetting the ram weight in at least one ram position.

In a preferred exemplary embodiment, the lubricating arrangement comprises a lubricant distributor. The lubricant is supplied to the lubricant distributor from a lubricant source through a delivery line. The lubricant distributor comprises several lubricant outlets, so that the lubricant can be transported to different lubricating points.

The lubricating arrangement may comprise a pressure increasing unit in the supply line to the pressure agent distributor. The pressure increasing unit may also be referred to as the "booster". If no lubricant can be transported through the pressure increasing unit because the pressure applied to the output side of the pressure increasing unit is too great, the pressure increasing unit switches from a first into a second operating state in that it increases the output pressure. In this second operating state, a greater lubricant pressure exists on the output side of the pressure increasing unit, and thus on the input side of the lubricant distributor, than in the first operating state of the pressure increasing unit, in which state no pressure change is performed by the pressure increasing unit. Consequently, the pressure increasing unit can make available, to each and every lubricant outlet of the pressure distributor, an increased lubricant pressure.

As an alternative, it is also possible to connect the reversible pressure increasing unit downstream to one of the lubricant outlets. In this case, the lubricant pressure made available at the lubricant outlet is increased if, due to the counter-pressure prevailing on the affected lubricating point, any other lubricant transport is not possible. Considering this modification, it is only the lubricant pressure of the associate lubricating point that is changed, whereby said lubricating point is connected to the affected lubricant outlet of the lubricant distributor. This offers the advantage that the lubricant distributor can be designed for lower pressures.

In a preferred embodiment, at least one of the lubricant outlets of the lubricant distributor is configured as a high-pressure outlet. At this high-pressure outlet, a higher lubricant pressure is made available than at the other lubricant outlets that are configured as normal-pressure outlets. It is also possible to provide more than two or three lubricant pressure levels on the lubricant distributor. In doing so, a separate pressure increasing unit will be unnecessary. The lubricant pressure provided as a function of the press operating state will be made directly available by the lubricant distributor itself.

In an exemplary embodiment, the lubricant distributor comprises several movable distributor pistons, each having two piston working surfaces. Each piston working surface is located in a working chamber in a distributor housing. Each working chamber communicates with one of the lubricant outlets. By moving the distributor piston, it is possible for the affected piston working surface to transport the lubricant out of the working chamber to the associate lubricant outlet. Adjoining the high-pressure outlet connected with the working chamber is a distributor piston with a piston working surface that is smaller than the piston working surfaces adjoining the other working chambers, said latter piston working surfaces being associated with the lubricant outlets that are configured as normal-pressure outlets. Considering this embodiment, it is possible in a very simple manner to provide different lubricant pressures at various lubricant outlets, without requiring additional pressure changing arrangements. Preferably, the distributor pistons are interchangeably arranged in the distributor housing and can be selected and installed depending on the individual application.

In doing so, the piston working surface associated with the high-pressure outlet can be configured as an annular surface. Preferably, the outside diameter of the annular surface may correspond to the diameter of the other piston working surfaces. The annular surface may be provided around a cylindrical projection that is moved, through an opening in the working chamber wall, out of the working chamber. Due to this simple measure, the effective piston working surface can be reduced. The face of the cylindrical projection is vented, in particular, toward the environment, and sealed in the region of the opening of the working chamber wall.

In addition, it is advantageous if the lubricant distributor is associated with a reversing arrangement that—depending on the press operating state—connect either the high-pressure outlet of the lubricant outlets or another of the lubricant outlets configured as normal-pressure outlets to the at least one lubricating point of the sliding bearing. The reversing arrangement can be reversed by means of a hydraulic control signal or an electrical control signal.

Furthermore, in a preferred embodiment of the invention, the lubricant distributor is associated with a monitoring arrangement. Preferably, the monitoring arrangement generates an electrical monitoring signal. The monitoring signal indicates whether the lubricant output to the lubricant outlets of the lubricant distributor takes place. In one exemplary embodiment, the monitoring arrangement can detect the movement of one of the distributor pistons. In this case, the monitoring signal can indicate whether the distributor piston is moving or is at rest. If the rest state exceeds a prespecified time duration value, there is no lubricant being dispensed to the lubricant outlets of the lubricant distributor.

If the monitoring arrangement detects that there is no lubricant being dispensed, it is concluded that the counter-pressure on one of the lubricating points is such that lubricant can no longer be supplied. This is the case, for example, when the bearing gap between the two transmission elements on the affected lubricating point is too small. This situation may occur when the press is in its second press operating state. In this case, the lubricant pressure on the affected lubricating point can be increased via the monitoring signal. In one exemplary embodiment this is accomplished in that the monitoring signal is used for reversing the reversing arrangement.

BRIEF DESCRIPTION OF THE DRAWINGS

Advantageous embodiments of the invention can be inferred from the dependent patent claims as well as from the description. The description is restricted to essential features of the invention. The drawings are to be used for supplementary reference. Hereinafter, the invention will be explained in greater detail with the use of exemplary embodiments and with reference to the drawings. They show in:

DETAILED DESCRIPTION OF VARIOUS EMBODIMENTS

Figure 1:
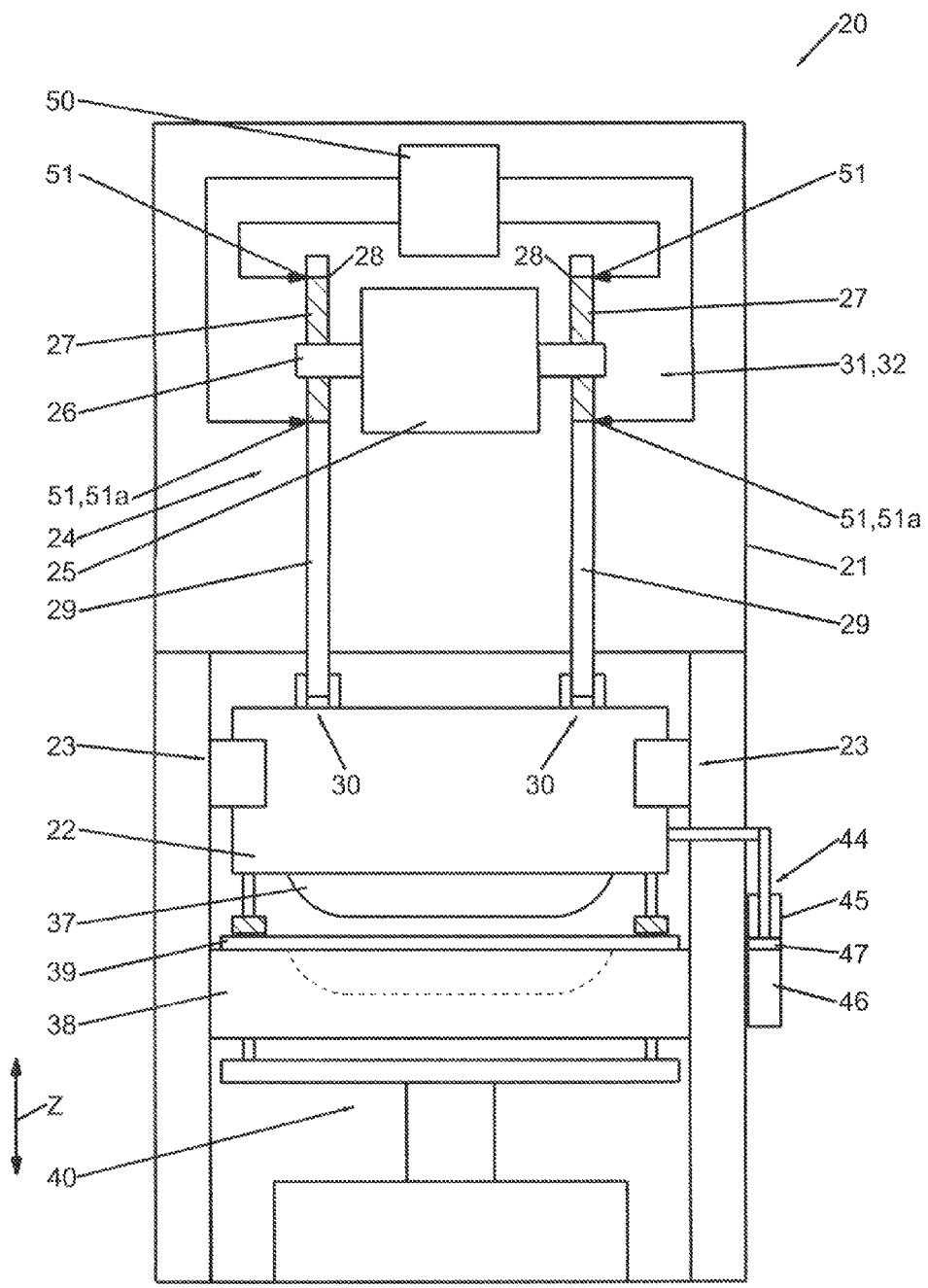
FIG. 1 a schematic representation, similar to a block diagram, of a press configured as a servo press.

FIG. 1 shows a press 20 comprising a press frame 21 on which is arranged a ram 22, said ram being vertically movable in a working direction Z as in the example. The ram 22 is guided by a guide arrangement 23 on the press frame 21 so that it can be moved in working direction Z. The ram 22 is moved via a press drive 24. In the exemplary embodiment as in FIG. 1, the press drive 24 comprises an electric motor 25 that is embodied as a servo motor or a torque motor. The motor of the press drive 24 is connected to the ram via a transmission 31. In the first exemplary embodiment as in FIG. 1, the transmission is configured as an eccentric mechanism 32. The electric motor 25 drives a shaft 26 on which are non-rotatably arranged at least one and, as in the example, two eccentrics 27. Via a sliding bearing 28, an eccentric rod 29 is rotatably supported on each eccentric 27. On the end opposite the eccentric 27, each eccentric rod 29 is linked on the ram 22 with a link joint 30. The link joints 30 can also comprise a sliding bearing. During a rotation of the shaft 26, the ram 22 is moved into the working direction Z via the eccentrics 27 and the eccentric rods 29. Referring to the exemplary embodiment shown in FIG. 1, the eccentric mechanism 32 comprises the eccentrics 27 as well as the eccentric rods 29.

Figure 4:
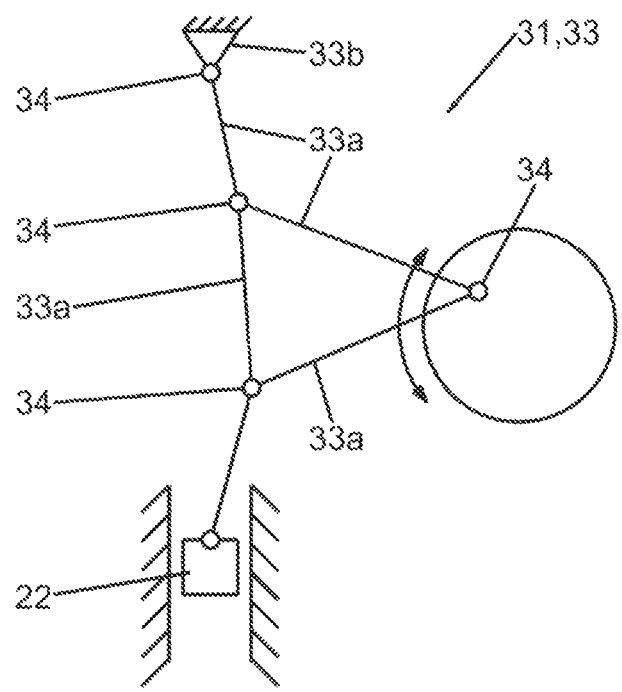
FIG. 4 a schematic representation of an alternative embodiment of a press drive configured as a toggle mechanism.

As shown in FIG. 4, the transmission 31 may also be configured as a toggle mechanism 33 comprising several toggles 33a. The toggle mechanism 33 comprises several bearings 34 for the rotatable support of the toggles 33a, which bearings may also be configured as sliding bearings. In the toggle mechanism 33, the two transmission elements 35, 36 that are supported in contact with each other via a bearing 34 may be the toggles 33a or other bearing elements 33b. In the exemplary embodiment as in FIG. 1, the eccentric 27 is the first transmission element 35 and the eccentric rod 29 is the second transmission element 36.

The ram 22 of the press 20 supports an upper tool component 37 that interacts with a lower tool component 38 in order to reshape a workpiece 39, for example a sheet metal blank. The lower tool component 38 is supported on a press table 40.

In the exemplary embodiment of FIG. 1, the press 20 additionally comprises a weight equalizing arrangement 44. The weight equalizing arrangement 44 is disposed to counteract the weight of the ram 22 with counter-acting equalizing force. To accomplish this, the weight equalizing arrangement 44 comprises a pneumatic cylinder 45 containing a pneumatic chamber 46. The volume of the pneumatic chamber 46 is reduced during the downward movement of the ram 22 via a cylinder piston 47 that is connected to the ram 22, thereby increasing the equalizing force counter-acting the weight of the ram 22. Considering such a weight equalizing arrangement 44, the weight of the ram 22 cannot be offset along the entire path of the ram 22 because the equalizing force generated by the weight equalizing arrangement 44 also increases as the ram 22 moves in downward direction. Preferably, the weight of the ram 22 is offset in the center between the upper reversal point OT and the lower reversal point UT of the ram 22. If the ram 22 is located between its center position and the lower reversal point UT, the weight of the ram 22 will thus be over-compensated. This over-compensation affects the bearing lubrication of the sliding bearing 28, 34, which will be explained in greater detail hereinafter.

A lubricating arrangement 50 is used for the bearing lubrication of the sliding bearing 28, 34 with a lubricant. The lubricating arrangement 50 is disposed to supply at least one or, as in the example, several lubricating points 51 on the sliding bearing 28, 34 with the lubricant. It is understood that the lubricating arrangement 50 is able to lubricate other bearings or transmission elements of the transmission 31 in addition to the sliding bearing 28, 34. The sliding bearing 28 of the eccentric mechanism 32 was chosen only as an example for the explanation of the invention hereinafter.

Figure 2:
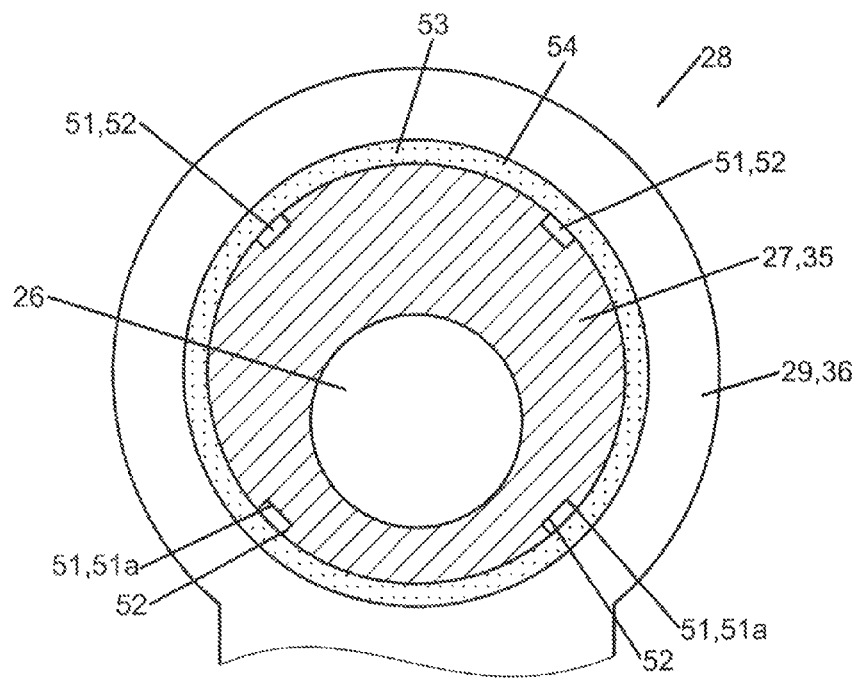
FIGS. 2 and 3 a sliding bearing of the transmission of the press drive of the press as in FIG. 1, in various press operating states.
Figure 3:
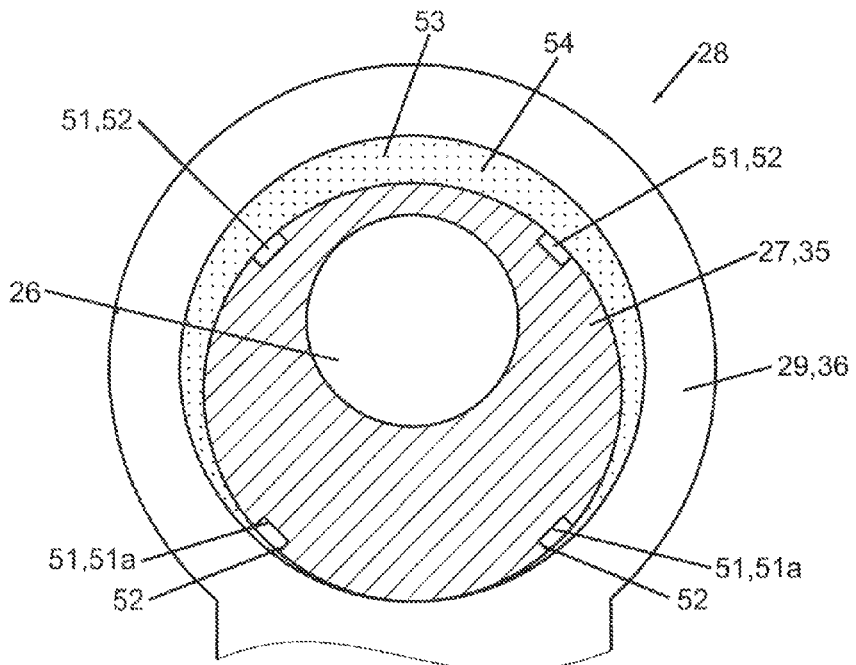

FIGS. 2 and 3 show the sliding bearing 28. The sliding bearing 28 comprises several lubricating points 51. In the exemplary embodiment, the lubricating points 51 are represented by the lubricating grooves 52 that are provided in the first transmission element 35 represented by the eccentric 27. The lubricant is supplied to the lubricating grooves 52 via the lubricating arrangement 50. The lubricant is dispensed from the lubricating grooves 52 into a bearing gap 53 between the two transmission elements 35, 36 and between the eccentric and the eccentric rod 29, as is shown in the example. In the most favorable case, in particular in the case of hydrodynamic lubricating situations, a lubricant film 54 is formed in the bearing gap 53 between the two transmission elements 35, 36, said lubricant having a thickness that is greater at each point than the maximum size of a debris particle. Debris particles may be present in the lubricant. Their size depends on the lubricant filter 55 that is being used. A lubricant film 54 having sufficient thickness is schematically shown in FIG. 2. The lubricant film thickness need not necessarily be the same at each point. In conjunction with this, it is important that the lubricant film 54—at its point of lowest thickness—still have a thickness that is somewhat greater than the largest debris particles in the lubricant.

Figure 5:
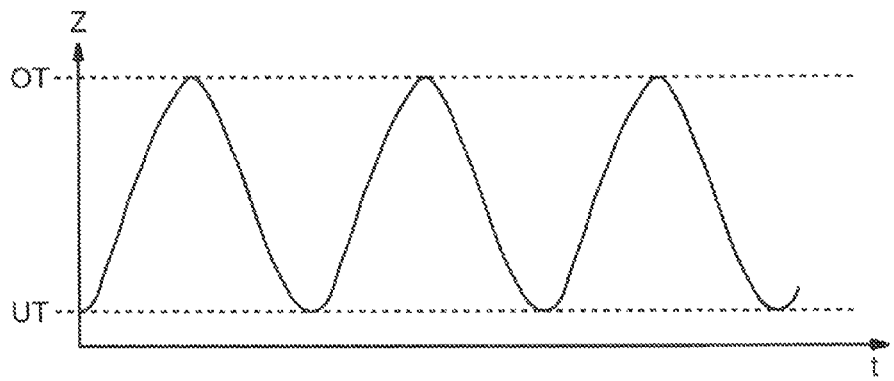
FIGS. 5 and 6 two exemplary path/time profiles of the ram of the press.
Figure 7:
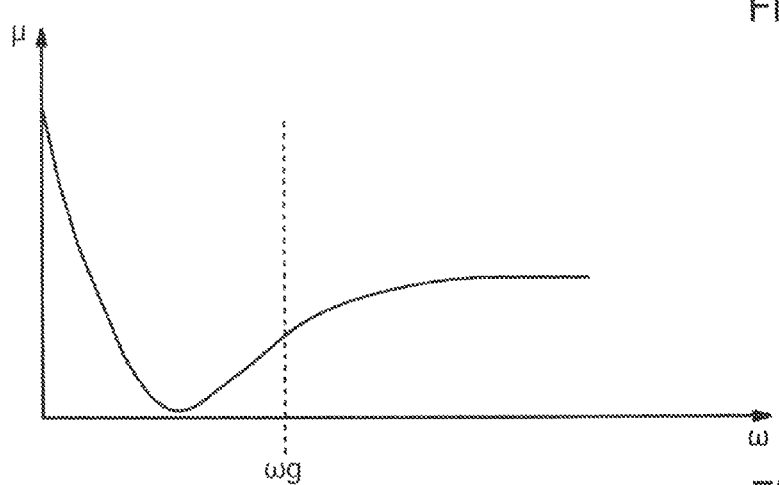
FIG. 7 a schematic representation of the relationship between the relative speed ω and the friction value μ between the first transmission element and the second transmission element on the sliding bearing of the transmission.

The relative movement between the first transmission element 35 and the second transmission element 36 and, in particular, the relative speed ω affect the formation of the lubricant film 54 between the two transmission elements 35, 36. FIG. 5 shows an exemplary movement profile for the press ram 22 in working direction Z between the upper reversal point OT and the lower reversal point UT over time t. As long as the ram 22 moves continuously up and down in the working direction Z, the eccentric 27 rotates together with the shaft 26 and relative to the eccentric rod 29 in the sliding bearing 28. If this relative speed ω between the eccentric 27 and the eccentric rod 29 is greater than a threshold value ωg, the friction value between the eccentric 27 and the eccentric rod 29 is sufficiently small (FIG. 7). If the relative speed ω of the first transmission element 35 relative to the second transmission element 36 is greater than or equal to the pre-specified threshold value ωg, the press is in its first press operating state. In doing so, the lubricating arrangement 50 makes available its first lubricant pressure p1 at the lubricating points 51. As a rule, a hydrodynamic lubrication of the sliding bearing 28 is achieved. In this case, the Sommerfeld number is greater than or equal to 10.

The threshold value ωg can be pre-specified as a function of the parameters and, for example, may be a function of the bearing force between the two transmission elements and/or the viscosity of the lubricant and/or the radial dimension or thickness of the bearing gap 53.

Figure 6:
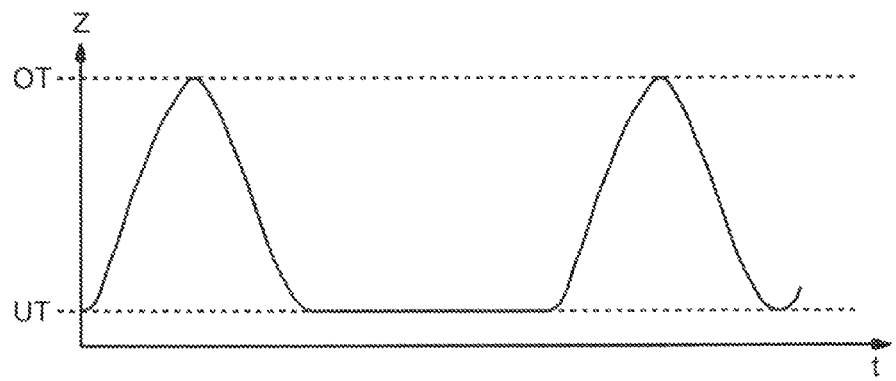

If the relative speed between the two transmission elements 35, 36 is less than the threshold value ωg, the lubricating arrangement 50 makes available to itself—at least at one of the lubricating points 51 that is referred to as the first lubricating point 51a—the lubricant having the second lubricant pressure p2, said pressure being greater than the first lubricant pressure p1. Such a situation can arise, for example, when the ram 22 moves very slowly or, as shown in the example of FIG. 6, when said ram is temporarily stopped at its lower reversal point UT, for example, in order to machine the workpiece 39 under the force of the pressure of the ram 22 or in order to close a mould for a pre-specified time under the weight of the pressure of the ram 22. If the ram 22 moves very slowly or if it is stopped, the relative speed ω between the two transmission elements 35, 36 of the sliding bearing 28 drops below the threshold value ωg, so that the press 20 is in its second press operating state. This second press operating state can have the effect that the lubricant film 54 greatly decreases in its thickness or is completely displaced at one point of the sliding bearing, which, in turn, can have the effect that the two transmission elements 35, 36 are supported next to each other without sufficient space between them or that they are in direct contact with each other.

An example of such a situation is shown by FIG. 3. The eccentric 27 of the sliding bearing 28 is in direct contact with the eccentric rod 29. This situation may occur when the movement of the ram 22 is greatly decelerated or when the ram 22 is stopped. In addition, referring to the presses 20 comprising a weight equalizing arrangement 44, there is the fact that the ram 22 is pushed upward into positions in the region of its lower reversal point UT by the weight equalizing arrangement 44, thus causing the bearing gap 53 to become smaller in the lower region of the sliding bearing 28. If, due to the absent dynamic effects during the movement of the eccentric rod 29 relative to the link joint 30, the lubricant film cannot be maintained, insufficient lubrication is the result and, potentially, there is the abutment of the two transmission elements 35, 36 against each other. The same effect may also occur in other sliding bearings 34 of the transmission 31.

Consequently, the lubricating arrangement 50 supplies lubricant, under the increased second lubricant pressure p2, to at least one of the first lubricating points 51a provided in the region in which the two transmission elements 35, 36 in the second press operating state can come into abutment with each other. This increased pressure causes the lubricant film 54 at the first lubricating points 51a to be increased again in order to decrease the friction μ between the two transmission elements 35, 36. In the ideal case, the increased lubricant pressure also causes a build-up of a lubricant film 54 in the second press operating state, the thickness of said latter lubricant film being greater than the maximum size of the debris particles contained in the lubricant.

Exemplary embodiments of a lubricating arrangement 50 designed therefor will be described hereinafter with reference to FIGS. 8 through 11.

The lubricating arrangement 50 comprises a delivery line 60 that is connected to a lubricant source 62 via a supply line 61 of the press 20. The lubricant filter 55 is interposed in the delivery line 60 and/or in the supply line 61. All debris particles greater than a maximally permissible debris particle size are filtered out of the lubricant by this filter.

In the exemplary embodiment, a throttle 63 is interposed in the delivery line 60, said throttle limiting the flow rate.

The delivery line 66 is connected to a supply connection 64 of a lubricant distributor 65. The lubricant distributor 65 is supplied with the lubricant via the supply connection 64. The lubricant distributor 65 has several lubricant outlets 66. In the exemplary embodiments described herein, a lubricant distributor 65 with six lubricant outlets 66 is provided. Each lubricant outlet 66 communicates with an associate lubricating point 51 in the transmission 31 of the press 20, so that the lubricant made available to the lubricant distributor 65 is transported to various lubricating points 51.

Figure 8:
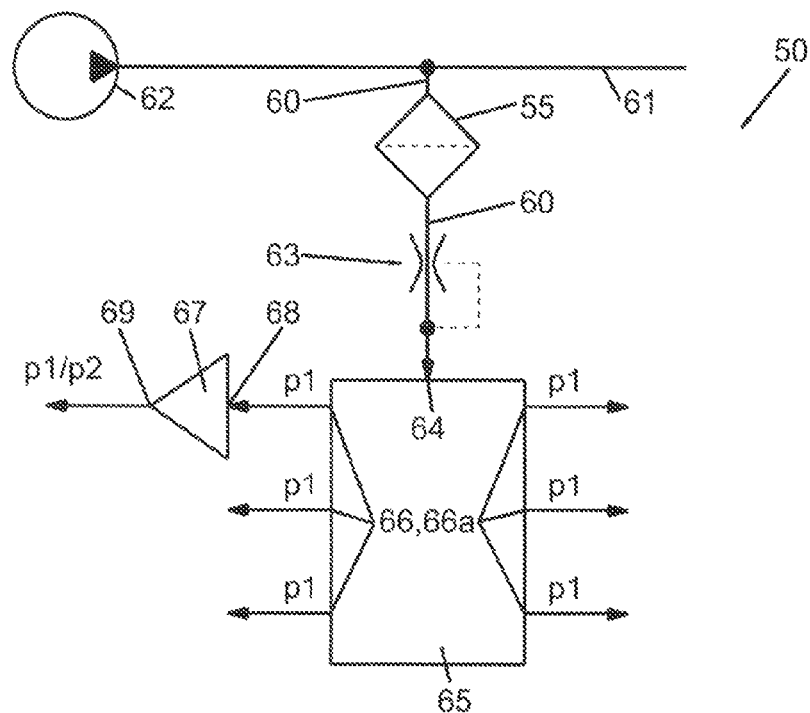
FIG. 8 a schematic representation, similar to a block diagram, of a first exemplary embodiment of a lubricating arrangement for the press.

Referring to the first exemplary embodiment of the lubricating arrangement 50 in accordance with FIG. 8, all the lubricant outlets 66 are configured as normal-pressure outlets 66a, where the lubricant is dispensed at the first lubricant pressure p1. In order to transport, in the second press operating state, the lubricant having the second lubricant pressure p2, said pressure being greater than the first lubricant pressure p1, to the at least one first lubricating point 51a a pressure increasing arrangement 67 is connected to one or several lubricant outlets 66. This pressure increasing arrangement 67 is reversible. In its first operating state, the lubricant is passed—without pressure increase—between its inlet 68 and its outlet 69. This first operating state is maintained as long as a prespecified volume flow of lubricant can flow through the pressure increasing arrangement 67. If the pressure increases at the outlet 69 and if the lubricant volume flow can thus not be maintained, the pressure increasing arrangement 67 reverts to its second operating mode, e.g., where the pressure at the outlet 69 is higher than the pressure at the inlet 68. In this second operating mode, the pressure increasing arrangement 67 increases the pressure at the outlet 69 to the second lubricant pressure p2. Consequently, when the at least one first lubricating point 51a is cut off, as it were, and no amount or only negligibly small amounts of lubricant can flow out of this first lubricating point 51a into the bearing gap 52, there occurs an increase of the lubricant pressure. Consequently, if the lubricating groove 52 in the first transmission element 35 is completely or almost completely closed by the second transmission element 36, the pressure on the affected lubricating point 51 increases, so that the lubricating arrangement 50 can no longer transport any lubricant to this lubricating point 51 that is referred to as the first lubricating point 51a. This operating state is detected by the pressure increasing arrangement 67 and the lubricant pressure is increased from the first lubricant pressure p1 to the second lubricant pressure p2.

A pressure increasing arrangement 67 is connected to all the lubricant outlets 66 that communicate with a first lubricating point 51a and that thus receive a greater lubricant pressure p2 in the second press operating state.

Figure 9:
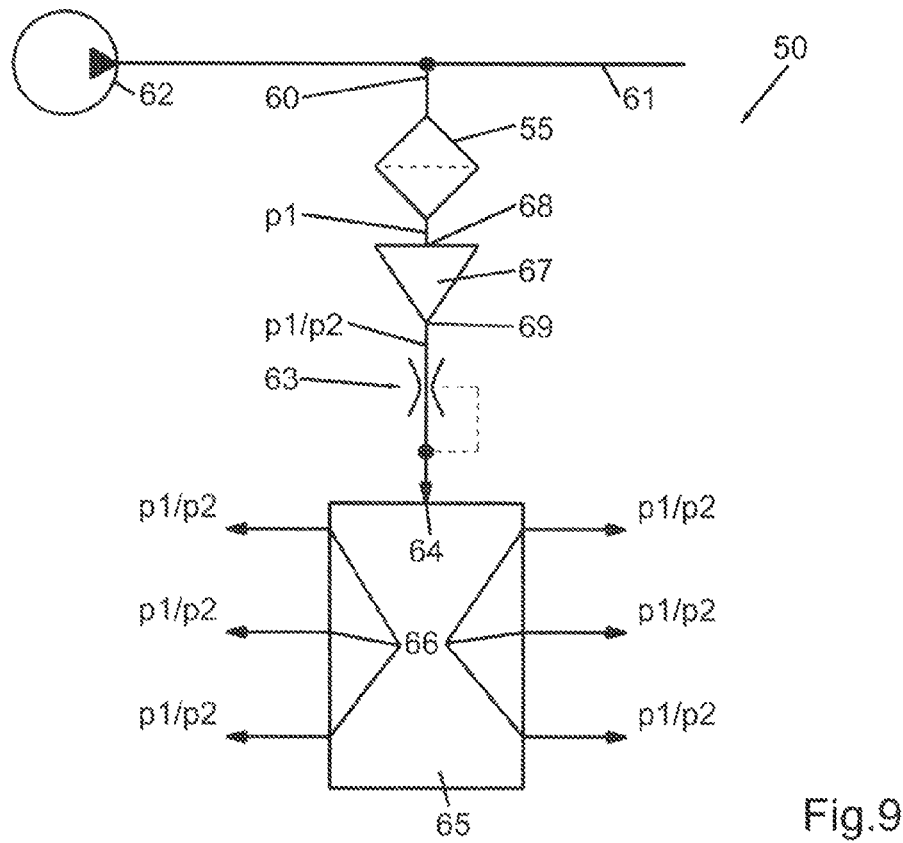
FIG. 9 a schematic representation, similar to a block diagram, of a second exemplary embodiment of a lubricating arrangement for the press.

FIG. 9 shows a second exemplary embodiment of the lubricating arrangement 50. Different from the first exemplary embodiment, in this case the pressure increasing arrangement 67 is located in the delivery line 60. The result is that, in the second press operating state, an already increased second lubricant pressure p2 is supplied to the lubricant distributor 65 at the supply connection 64, said second lubricant pressure then being accordingly passed on to all the lubricant outlets 66. Consequently, the first lubricant pressure p1 or the second lubricant pressure p2 can be made available to all the lubricant outlets 66, depending on the operating state of the pressure increasing arrangement 67 in the delivery line 60.

The lubricant distributor 65 is not only disposed to distribute the lubricant from the supply connection 64 to the lubricant outlets 66. It is also disposed to limit the quantity of lubricant dispensed to the lubricant outlet 66, so that, in case of a leak of a line or of a lubricating point 51, the other lubricating points 51 of the transmission are still supplied with lubricant.

Figure 10:
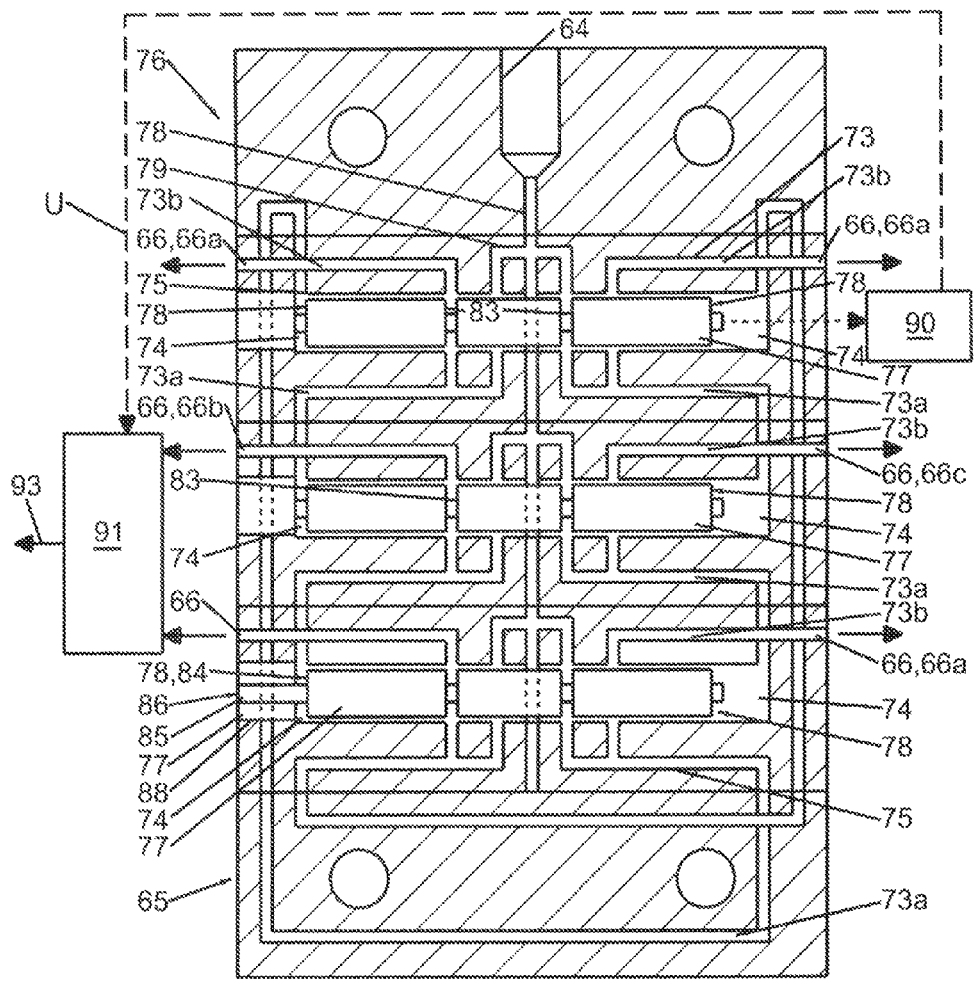
FIG. 10 a schematic representation, similar to a block diagram, of a third exemplary embodiment of a lubricating arrangement for the press comprising a lubricant distributor, a reversing arrangement and a monitoring arrangement.

FIG. 10 shows an exemplary embodiment of a lubricant distributor 65. The function explained with reference to FIG. 10 and the basic design of the lubricant distributor are similar to the design and the function of the lubricant distributor 65 in accordance with FIGS. 8 and 9. Different from the first two exemplary embodiments of the lubricating arrangement 50 in accordance with FIGS. 8 and 9, the provision of a pressure increasing arrangement 67 is not necessary, however, because of the special embodiment of the lubricant distributor 65. The lubricant distributor 65 in accordance with FIG. 10 comprises a lubricant outlet 66 that is configured as the high pressure outlet 66b and that makes available at its outlet the lubricant under the second lubricant pressure p2.

In the exemplary embodiment described here, the lubricant distributor 65 comprises six lubricant outlets 66. Via an output channel 73, each lubricant outlet 66 is in fluid communication with a working chamber 74. Respectively two working chambers 74 are formed by sections of a shared cylindrical piston receptacle 75 in a distributor housing 76. Located in each piston receptacle 75 is a distributor piston 77. The distributor piston 77 can be moved in axial direction in the piston receptacle 75, in which case said distributor piston 77 has a piston working surface 78 each on both axial ends. Each piston working surface 78 delimits an associate working chamber 74 in the piston receptacle 75.

Each output channel 73 has a first channel section 73a directly connected to the associate working chamber 74 and a second channel section 73b directly connected to the associate lubricant outlet 66. The first channel section 73a connects a working chamber 74 with the piston receptacle 75 for another distributor piston 77. The second channel section 73b terminates, viewed in axial direction of the piston receptacle 75, approximately in the same axial position as the first channel section 73a. Depending on the position of the distributor piston 77, the two channel sections 73a, 73b can be separated from fluid communication or be connected for fluid communication.

In this manner, each piston receptacle 75 is traversed by two output channels 73 that are connected with the working chambers 74 of another piston receptacle 75.

The supply connection 64 is in fluid communication with a supply channel system 78 that extends inside the distributor housing 76. Each working chamber 74 can be brought into fluid communication with the supply connection 64 via an activating channel 79 of the supply channel system 78. To accomplish this, the activating channel 79, said channel being connected to a working chamber 74, traverses the piston receptacle 75 for another distributor piston 77, as has also been described hereinabove in conjunction with the two channel sections 63a and 63b. Each piston receptacle 75 is traversed by two activating channels 79 that can be opened for fluid communication or blocked from fluid communication via the distributor piston 77 located in the piston receptacle 75.

Each distributor piston 77 has two control grooves 83 provided in the piston, said groove being at an axial distance from each other. Depending on the position of the distributor piston 77, it is possible to enable, for fluid communication, either one of the two activating channels 79 or one of the two output channels 73 per control groove 83, whereby each of the two associate channels sections are connected in fluid communication via the piston receptacle 75. The control groove reduces the diameter of the distributor piston, so that—in this region—the control groove 83 cannot abut against the inside surface of the piston receptacle in a sealing manner. Each distributor piston 77 has two switching positions. In the one switching position, said distributor piston connects the one working chamber 74 of another distributor piston 77 with the supply connection 64, while said distributor piston connects the respectively other working chamber 74 of the same distributor piston 77 with the associate lubricant outlet 66. The resultant effect is that the one working chamber 74 of the piston receptacle 75 is filled with lubricant and, in doing so, the associate distributor piston 77 is moved into the respectively other switching position. As a result of this movement, the distributor piston 77 displaces the lubricant present in the respectively other working chamber 74 toward its lubricant outlet 66. In doing so, the distributor pistons 77 are sequentially reversed between their switching positions.

Referring to the switching position shown in FIG. 10, the above-illustrated distributor piston 77 is first moved to the right. Its right working chamber 74 is connected with the associate lubricant outlet 66 via the output channel 73 and the left control groove 83 of the distributor piston 77 that is the lowest in the Figure. The activated left working chamber 74 of the uppermost piston receptacle 75 is connected to the supply connection 74 for fluid communication via the activating channel 79 and the right control groove 83 of the lowermost distributor piston 77. Consequently, the uppermost control piston 77 first displaces the lubricant from its right working chamber 74, while it fills the left working chamber 74 with lubricant. When the uppermost control piston 77 moves to the right, it changes the position of its control grooves 83. The result of this is that, for fluid communication, now the right working chamber 74 of the center distributor piston is connected to the associate lubricant outlet 66 and the left working chamber 74 of the center distributor piston 77 is connected to the supply connection 74 via the activating channel 79. Consequently, the center distributor piston 77 is next moved from the left to the right.

Subsequently, the changed position of the control grooves 83 of the center distributor piston 77 causes the lowermost distributor piston 77 to also be moved to the right, whereby then all the other distributor pistons 77 assume their other switching position that is not shown in FIG. 10. The sequential process beings anew and the distributor pistons 77 are again moved back—one after the other—into the switching position shown in FIG. 10. In this manner, depending on the volume of the working chamber 74, respectively one specific quantity of lubricant is made available at the lubricant outlets 66.

In the first two exemplary embodiments in accordance with FIGS. 8 and 9, all the piston working surfaces 78 are of equal size. In the third exemplary embodiment of the lubricating arrangement 50 in accordance with FIG. 10, a lubricant distributor 65 is provided, said lubricant distributor having one lubricant outlet 66 configured as a high-pressure outlet 66b. This piston working surface 78 associated with the high-pressure outlet 66b is smaller than the other piston working surfaces 78 of the lubricant distributor 65. In accordance with the example, the piston working surface 78 associated with the high-pressure outlet 66b is configured as an annular piston surface 84. The annular piston surface 84 is arranged around a projection and, as in the example, around a cylindrical projection 85 that extends coaxially with respect to the distributor piston 77. The projection 85 is moved out of the associate working chamber 74 in such a manner that its face 86 is always located outside the working chamber 74 in each position of the distributor piston 77. In doing so, the face 86 of this projection 85 is thus not a component of the piston working surface 78 which, consequently, is formed only the annular surface 84 around the projection 85.

The projection 85 comes into engagement with an opening 87 of the working chamber wall 88, said wall delimiting the working chamber 74 relative to the piston working surface 78. There, the projection 85 may be supported so that it can be shifted in axial direction and be sealed with respect to the environment. Let it be assumed that the annular piston surface 84 has a second area value A2 and the opposite piston working surface 78 of the same distributor piston 77 has a first area value A1. The pressures in the two working chambers 74 of this distributor piston 77 behave inversely proportional to the area vales. Therefore:

$$p1/p2=A2/A1.$$

Consequently, the second lubricant pressure p2 is made available in the working chamber 74 associated with the annular piston surface 84 and in the high-pressure outlet p2 connected to said working chamber, when a first lubricant pressure p1 is applied to the piston working surface 78 of the distributor piston 77 opposite the annular piston surface 84. Inasmuch as in the case of the other distributor pistons the two piston working surfaces 78 are of equal size, no pressure change occurs there.

Conversely, when a first lubricant pressure p1 is applied to the annular piston surface 84 of the distributor piston 77 having the annular piston surface 84, the lubricant pressure is reduced. On the piston working surface 78 that is larger than the annular piston surface 84 a lower lubricant pressure p3 occurs, said lower pressure being transmitted to the lubricant outlet 66 that is configured as the low-pressure outlet 66c.

In the exemplary embodiment, the lubricant distributor 65 comprises three distributor pistons 77 and thus six lubricant outlets 66. The number of distributor pistons 77 and, consequently, the lubricant outlets 66 may vary. It is also possible to provide several different lubricant pressure levels at various distributor pistons 77 by varying the size of the piston working surfaces 78.

In the example, the lubricant distributor 65 is associated with a monitoring arrangement 90. The monitoring arrangement 90 is disposed to monitor the lubricant transport at the pressure outlets 66 of the lubricant distributor 65. If no lubricant is dispensed at the lubricant outlets 66, this can be detected by means of the monitoring signal U of the monitoring arrangement 90. In the exemplary embodiment, the monitoring arrangement 90 monitors the switching movement of an associate distributor piston. 77. The switching movement is indicated via the monitoring signal U. Consequently, it is possible to detect if the associate distributor piston 77 is not moved back and forth with the pre-specified switching frequency but has stopped for a more extended period of time. If this is the case, there will no longer be any lubricant dispensed at the lubricant outlets 66.

If there is no lubricant dispensation 66 due to the rest position of the distributor piston 77, this may be due to the fact that the press 20 is in its second press operating state. In doing so, no additional lubricant can be dispensed at the first lubricating points 51a and thus—due to the resultant build-up of a counter-pressure—the piston movement of the distributor pistons 77 is hindered. This is detected by the monitoring arrangement 90, and the monitoring signal U is used to actuate a reversing arrangement 91. The at least one first lubricating point 51a is then connected to a high-pressure outlet 66b of the lubricant distributor 65. Due to the lubricant with the higher second lubricant pressure p2 being transported to the at least one first lubricating point 51, the at least one first lubricating point 51a can, as it were, be cleared again and dispense lubricant into the bearing gap 53 of the sliding bearing 28.

Figure 11:
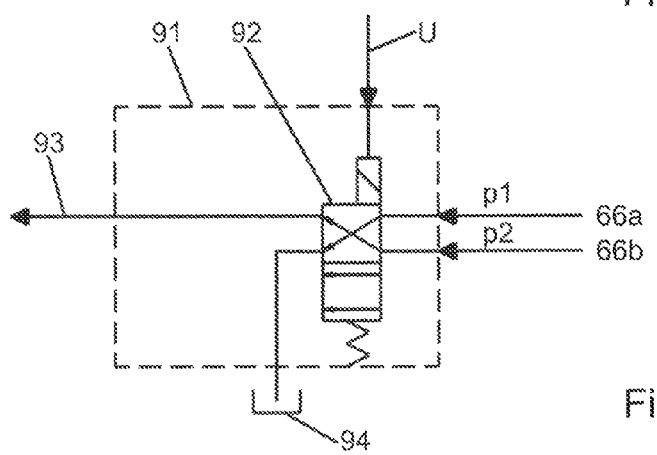
FIG. 11 a block diagram of the reversing arrangement of FIG. 10.

For example, the reversing arrangement 91 can comprise a 2/2-way valve 92 that can be reversed between its two switching positions by the preferably electrical monitoring signal U. In the first press operating state, a normal-pressure outlet 66a of the lubricant distributor 65 is connected with the lubricant outlet 93 of the reversing arrangement 91 via the 2/2-way valve. The lubricant dispensed via the high-pressure outlet 66b with the second lubricant pressure p2 is transported into a lubricant reservoir 94. In the second press operating state, the 2/2-way valve 92 is reversed into the switching position that is illustrated by FIG. 11. Then, the high-pressure outlet 66b of the lubricant distributor 65 is connected to the lubricant outlet 93, and the affected lubricating point 51 or the affected first lubricating point 51a is supplied with lubricant that is subject to the second lubricant pressure p2.

The lubricating arrangement 50 in accordance with the present invention can also by used—independently of the press 20—for other working machines for lubricating a sliding bearing. Depending on the relative speed of the two elements supported in contact with each other on the sliding bearing 28, it is possible to make the lubricant at a first lubricant pressure p1 or at a greater second lubricant pressure p2 available on least one lubricating point 51a of the sliding bearing 28.

The invention relates to a press 20, to a method for operating the press 20, as well as to a lubricating arrangement 50 for the press 20 or for another working machine. The press 20 comprises a press drive 24 that is connected with a ram 22 of the press 20, which ram can be moved via a transmission 31 in a working direction Z. The transmission 31 comprises at least one sliding bearing 28 with one and, preferably, several lubricating points 51. In a first press operating state, all the lubricating points 51 of the sliding bearing 28 are supplied with lubricant at a first lubricant pressure p1. In a second press operating state, the thickness of the lubricant film 54 formed in the sliding bearing 28 drops below a minimum value in the region of at least one first lubricating point 51a. In this second press operating state, the at least one lubricating point 51a is supplied with lubricant at a second lubricating pressure p2, said second pressure p2 being greater than the first lubricant pressure p1, in order to avoid any increased wear of the sliding bearing 28.

LIST OF REFERENCE SIGNS

20 Press
21 Press frame
22 Ram
23 Guide arrangement
24 Press drive
25 Electric motor
26 Shaft
27 Eccentric
28 Sliding bearing
29 Eccentric rod
30 Link joint
31 Transmission
32 Eccentric mechanism
33 Toggle mechanism
34 Bearing
35 First transmission element
36 Second transmission element 37 Upper tool component
38 Lower tool component
39 Workpiece
40 Press table
44 Weight equalizing arrangement
45 Pneumatic cylinder
46 Pneumatic chamber
47 Cylinder piston
50 Lubricating arrangement
51 Lubricating point
52 Lubricating groove
53 Bearing gap
54 Lubricating film
55 Lubricant filter
60 Delivery line
61 Supply line
62 Lubricant source
63 Throttle
64 Supply connection
65 Lubricant distributor
66 Lubricant outlet
66a Normal-pressure outlet
66b High-pressure outlet
66c Low-pressure outlet
67 Pressure increasing arrangement
68 Inlet
69 Outlet
73 Output channel
73a First channel section
73b Second channel section
74 Working chamber
75 Piston receptacle
76 Distributor housing
77 Distributor piston
78 Supply channel system
79 Activating channel
83 Control groove
84 Annular piston surface
85 Projection
86 Face of Projection
90 Monitoring arrangement
91 Reversing arrangement
92 2/2-way valve
93 Lubricant outlet
94 Lubricant reservoir
A1 First area value
A2 Second area value
p1 First lubricant pressure
p2 Second lubricant pressure
OT Upper reversal point
UT Lower reversal point
U Monitoring signal
Z Working direction
ω Relative velocity
ωg Threshold value

What is claimed is:

1. Method for operating a press, the press including a movable ram for reshaping a workpiece, a press drive comprising a motor and a transmission connecting the motor with the ram, the transmission comprises at least one sliding bearing having at least one lubricating point, each of said at least one sliding bearing for supporting a first transmission element against a second transmission element in a sliding manner, the first transmission element and the second transmission element have a bearing gap therebetween, a lubricating arrangement including a lubricant source in fluid communication with a lubricant distributor having several lubricant outlets, each lubricant outlet in direct operative fluid communication with one of the at least one lubricating point of the transmission, each of the lubricant outlets in fluid communication with the bearing gap for causing a lubricant film to form between the first transmission element and the second transmission element having a predetermined minimum thickness during reshaping of the workpiece by the ram defining a first press operating state, a second press operating state defined by the lubricant film being less than the predetermined minimum thickness or completely displaced during reshaping of the workpiece by the ram, said method comprising the following steps:
   driving of the ram by the press drive,
   controlling or regulating the position and/or the force of the ram,
   supplying lubricant with the use of the lubricating arrangement to at least one lubricating point of the at least one sliding bearing of the transmission, wherein the first transmission element is supported in a sliding manner on the second transmission element,
   adjusting as a function of the press operating state between a first lubricant pressure (p1) maintained when the bearing gap is in the first press operating state and a second lubricant pressure (p2) higher than the first lubricating pressure (p1) when the bearing gap is in the second press operating state and/or adjusting the lubricant flow on at least one of the lubricating points as a function of the bearing gap being in the first press operating state or in the second press operating state.

2. Method for operating a press as in claim 1, further comprising the step of determining the first press operating state exists when a relative speed (ω) between the first transmission element and the second transmission element is equal to or greater than at least one pre-specified threshold value (ωg), and that the second press operating state exists when the relative speed (ω) between the first transmission element and the second transmission element is lower than the threshold value (ωg).

3. Method for operating a press as in claim 2, wherein the threshold value (ωg) is pre-specified as a function of parameters and is a function of a bearing force between the first transmission element and the second transmission element and/or the bearing gap and/or the viscosity of the lubricant.

4. Method for operating a press as in claim 1, wherein in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state further comprises using at least one of the lubricant outlets of the lubricant distributor as a high-pressure outlet for providing the higher second lubricant pressure (p2) than at the other lubricant outlets.

5. Method for operating a press as in claim 4, in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by utilizing a reversible pressure increasing unit operatively arranged in the delivery line.

6. Method for operating a press as in claim 4, further comprising the step of detecting the press operating state and providing the first lubricant pressure (p1) in the first press operating state and reversing to the second lubricant pressure (p2) in the second press operating state.

7. Method for operating a press as in claim 4, wherein in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using the lubricant distributor wherein the lubricant distributor comprises several movable distributor piston, each of said movable distributor pistons having respectively at least two piston working surfaces, each piston working surface is operatively arranged in a working chamber and each working chamber is operatively connected to a lubricant outlet, whereby due to the movement of one of the moveable distributor pistons, the lubricant transported through the delivery line into the respective working chamber is transported out of this working chamber to the respectively connected lubricant outlet.

8. Method for operating a press as in claim 7, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using a third piston working surface associated with the at least one high-pressure outlet is operatively arranged as an annular piston surface around a cylindrical projection, the working chamber having a working chamber wall, said projection operatively movable through an opening in the working chamber wall out of the working chamber.

9. Method for operating a press as in claim 7, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using a reversing arrangement of the lubricating arrangement that, depending on the press operating state, operatively connects the high-pressure outlet or one of the other lubricant outlets to the at least one lubricating point.

10. Method for operating a press as in claim 4, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using a monitoring arrangement associated with the lubricant distributor, said monitoring arrangement for generating a monitoring signal (U) for indicating whether lubricant is being dispensed at the lubricant outlets.

11. Method for operating a press as in claim 7, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using a monitoring arrangement for detecting the movement of one of the several movable distributor pistons and for generating a monitoring signal (U) for indicating whether an intended movement of the one of the several movable distributor pistons is being carried out.

12. Method for operating a press as in claim 11, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using the monitoring signal (U) for reversing the reversing arrangement.

13. Method for operating a press as in claim 7, further comprising in the step for adjusting between the first lubricant pressure (p1) maintained when the bearing gap is in the first press operating state and the second lubricant pressure (p2) when the bearing gap is in the second press operating state and/or for adjusting the lubricant flow on the at least one lubricating point as a function of the bearing gap being in the first press operating state or in the second press operating state, performing said adjustment or adjustments by using at least one of said movable distributor pistons having a third piston working surface which is smaller than the other piston working surfaces for operatively providing the at least one high-pressure outlet.

* * * * *